US012722338B2

(12) United States Patent
Trickle

(10) Patent No.: US 12,722,338 B2
(45) Date of Patent: Sep. 1, 2026

(54) CONSTANT STRAIN PEX EXPANSION TOOL HEAD

(71) Applicant: Zurn Water, LLC, Milwaukee, WI (US)

(72) Inventor: Glen Trickle, Elm Grove, WI (US)

(73) Assignee: Zurn Water, LLC, Milwaukee, WI (US)

( * ) Notice: Subject to any disclaimer, the term of this patent is extended or adjusted under 35 U.S.C. 154(b) by 1036 days.

(21) Appl. No.: 16/393,525

(22) Filed: Apr. 24, 2019

(65) Prior Publication Data

US 2019/0351605 A1 Nov. 21, 2019

Related U.S. Application Data

(60) Provisional application No. 62/673,708, filed on May 18, 2018.

(51) Int. Cl.
*B29C 57/04* (2006.01)
*B29C 57/00* (2006.01)
(Continued)

(52) U.S. Cl.
CPC ............ *B29C 57/04* (2013.01); *B29D 23/003* (2013.01); *B29C 57/00* (2013.01); *B29C 57/02* (2013.01);
(Continued)

(58) Field of Classification Search
CPC ................................ B29C 57/02; B29C 57/04
See application file for complete search history.

(56) References Cited

U.S. PATENT DOCUMENTS 3,677,684 A * 7/1972 Platz ....................... B29C 57/04 425/393
3,857,666 A * 12/1974 Barnett ................. B29B 13/025 72/85

(Continued)

FOREIGN PATENT DOCUMENTS

DE 4008642 A1 11/1990
WO 2013113509 A1 8/2013
WO 2017129540 A1 8/2017

OTHER PUBLICATIONS

"How to Make PEX Expansion Connections." YouTube, uploaded by HomeSupply, Mar. 14, 2014, www.youtube.com/watch?v=an4C5w0H-A0. (Year: 2014).*

(Continued)

*Primary Examiner* — Alison L Hindenlang
*Assistant Examiner* — Andrés E. Behrens, Jr.
(74) *Attorney, Agent, or Firm* — Husch Blackwell LLP

(57) ABSTRACT

Various improved designs for expansion tool heads are disclosed herein that are structured (1) to provide improved and more-evenly distributed strain in the pipe during the expansion strokes of the tool head which can include more gradually inducing the strain in the pipe and/or (2) to avoid the induction of plastic deformation of the pipe in regions of seal formation between the radial-inwardly facing surface of the pipe and the radially-outward facing surface of the fittings (i.e., the ribs of the fitting) especially in instances in which the tool head is not rotated between separate expansion steps. This may be achieved, for example, by the use of convexly curved outer profiles that limit initial insertion depth of the tool in the pipe prior to expansions and/or by the use of a "hybrid" toothed profile.

23 Claims, 16 Drawing Sheets

(51) Int. Cl.

| | |
|---|---|
| ***B29C 57/02*** | (2006.01) |
| ***B29D 23/00*** | (2006.01) |
| ***B31F 1/00*** | (2006.01) |
| *B29K 23/00* | (2006.01) |
| *B29L 23/00* | (2006.01) |

(52) U.S. Cl.

CPC ... *B29K 2023/0691* (2013.01); *B29L 2023/22* (2013.01); *B31F 1/00* (2013.01)

(56) References Cited

U.S. PATENT DOCUMENTS

| | | | | |
|---|---|---|---|---|
| 3,888,102 | A * | 6/1975 | Nigido | B29C 57/04 72/393 |
| 3,899,565 | A * | 8/1975 | de Putter | B29C 57/06 264/296 |
| 4,065,953 | A | 1/1978 | Frentzen et al. | |
| 4,646,548 | A | 3/1987 | Zimmerli et al. | |
| 5,744,085 | A | 4/1998 | Sorberg | |
| 6,862,766 | B2 * | 3/2005 | Geurts | B21D 41/026 29/268 |
| 7,128,560 | B2 | 10/2006 | Tandart | |
| 8,517,715 | B2 | 8/2013 | Thorson et al. | |
| 8,562,331 | B2 | 10/2013 | Schramm et al. | |
| 8,746,028 | B2 | 6/2014 | Duggan et al. | |
| 8,763,439 | B2 | 7/2014 | Thorson et al. | |
| 8,801,424 | B2 | 8/2014 | Lindner et al. | |
| 9,248,617 | B2 | 2/2016 | Lundequist et al. | |
| 9,327,337 | B2 | 5/2016 | Barthlein et al. | |
| 9,388,885 | B2 | 7/2016 | Hartranft et al. | |
| 9,433,993 | B2 | 9/2016 | Houle et al. | |
| 9,555,577 | B2 | 1/2017 | Greding | |
| 9,862,137 | B2 | 1/2018 | Dickert et al. | |
| 9,914,260 | B2 | 3/2018 | Ellice | |
| 2011/0239425 | A1 * | 10/2011 | Thorson | B29D 23/001 29/243.518 |
| 2012/0181727 | A1 * | 7/2012 | Lindner | B29C 57/04 264/288.4 |
| 2013/0341831 | A1 * | 12/2013 | Thorson | B21D 41/026 425/392 |
| 2015/0258598 | A1 * | 9/2015 | Frenken | F15B 15/063 72/393 |
| 2015/0367556 | A1 * | 12/2015 | Ellice | B29C 57/04 425/392 |
| 2016/0361864 | A1 | 12/2016 | Dickert et al. | |
| 2018/0029286 | A1 | 2/2018 | Li et al. | |
| 2020/0261959 | A1 * | 8/2020 | Wekwert | B29C 57/045 |

OTHER PUBLICATIONS

Harvie, Jamie. "PVC-Free Pipe Purchasers' Report." Healthy Building Network, Healthy Building Network, Nov. 1, 2002, healthybuilding.net/uploads/files/pvc-free-pipe-purchasers-report.pdf. (Year: 2002).*

"Cross-Linked Polyethylene." Wikipedia, Mar. 30, 2017, https://web.archive.org/web/20170330022600/https://en.wikipedia.org/wiki/Cross-linked_polyethylene (Year: 2017).*

"High-Density Polyethylene—Wikipedia." Wikipedia, web.archive.org/web/20170322080703/https://en.wikipedia.org/wiki/High-density_polyethylene. Accessed Mar. 22, 2017. (Year: 2017).*

* cited by examiner

CONSTANT STRAIN PEX EXPANSION TOOL HEAD

CROSS-REFERENCE TO RELATED APPLICATION

This application claims the benefit of U.S. Provisional Patent Application No. 62/673,708 filed May 18, 2018, which is hereby incorporated by reference for all purposes as if set forth in its entirety herein.

STATEMENT OF FEDERALLY SPONSORED RESEARCH OR DEVELOPMENT

Not applicable.

TECHNICAL FIELD

This application relates to expansion tool heads for the expansion of PEX tubing in the assembly of PEX plumbing connections.

BACKGROUND

PEX piping or tubing is commonly used in the plumbing of residential and commercial building construction. PEX tubing is made from am extruded crosslinked polyolefin, typically high density polyethylene (HDPE). PEX pipes are coupled to each other or to fixtures at fittings designed to form a water-tight seal between a radially-inward facing side of an axial end of the PEX pipe and a radially-outward facing side of the fitting which usually includes one or more circumferential ribs. In order to connect an end of a PEX pipe to a fitting via cold expansion (typically at room temperature), the opening of the axial end of the PEX pipe—which end often further includes a collar surrounding the end—is temporarily enlarged in diameter to allow the fitting to be inserted into the opening of the PEX pipe. As the axial end of the pipe and any surrounding collar naturally return towards their un-deformed and un-expanded states, the radially-inward facing side of the PEX pipe is compressed against the radially-outward facing side of the fitting, especially the ribs, to form the water-tight seal between the pipe and fitting.

To quickly and efficiently expand the axial ends of PEX tubing in the formation of connections or couplings with fittings, expansion tools are commonly used. Expansion tools typically feature an expansion tool head with a set of expandable jaws including a frusto-conically shaped portion. In use, a portion of the jaws that are frusto-conically shaped are initially inserted into the axial end of the PEX pipe. The inserted jaws are then actuated to move the jaws outward against the inner surface of the PEX pipe so that the jaws press against the PEX pipe to stretch the walls of the pipe and temporarily increase the PEX pipe's inner diameter. This expansion of the jaws can often be repeated multiple times—by retracting the jaws to a closed position, rotating the jaws angularly relative to the tool and pipe, and then re-expanding the jaws against the inner surface of the PEX pipe—in order to sufficiently enlarge the opening of the pipe to accommodate insertion of the fitting as well as to distribute the localized strain created by the jaws around the circumference of the PEX pipe at each individual expansion step.

SUMMARY

It is herein recognized that, when these jaws are expanded to engage the inner surface of the PEX pipe, how the jaws engage the pipe to induce the strain in the pipe can alter the strain distribution at the expansion step(s) and that improvements that would better or more evenly distribute this strain might provide great advantage to the robustness of the seal formed.

Conventionally, expansion tools have jaws in which in the retracted state, the jaws form a simple frusto-conical surface as wedge-shaped sections on each of the jaws for contacting the inside diameter of the PEX pipe. However, such a basic geometry could result in uneven strain distributions during the expansion step(s).

For example, the sections of the wedges of the jaws that contact the pipe can create axial lines of contact along the jaws and axial lines of non-contact between the jaws that create axial lines of strain during expansion. The lines of axial contact can, due to friction, locally hold the material of the PEX pipe contacting the jaws such that the material close to the points of contact are not strained while the strain that is generated in the pipe is primarily and preferentially generated along the axial lines of the material where the PEX pipe is not contacted by the jaws. Although the expansion process can include multiple steps that may help to improve strain distribution by rotating the tool head relative to the pipe, it is often the case that the amount of strain induced at each expansion stroke of the tool will not be equal and the initial preferential deformation will not be equalized by subsequent expansion steps. It is noted that such rotation of the tool head relative to the pipe may be manual (i.e., the user may rotate a manually-actuated tool or the pipe to attempt to equalize the induced circumferential strain which occurs during expansion) or automatic (i.e., a power tool may automatically rotate the tool head some amount between steps). However, if such rotation is not made or is attempted but improperly executed, the axial linear strain of adjacent expansion steps can be exacerbated or stacked.

Still further, if the wedges are frusto-conically shaped, then a distal tip of the jaws may dig into the radially-inward facing surface of the pipe (especially on the first expansion stroke) creating some amount of preferential deformation including some amount of deformation that may be plastic or permanent in nature rather than elastic. If this plastic deformation occurs at a depth in the opening of the PEX pipe corresponding to the sealing ribs of the fitting that the pipe is received upon, then that or those regions of plastic deformation may provide potential leak pathways from the inner volume of the pipe between the fitting and the pipe where portions of the pipe have been excessively plastically deformed—especially when the deformation creates a pathway axially past the sealing rib of the fitting.

Various improved designs for expansion tool heads are disclosed herein that are structured (1) to provide improved and more-evenly distributed strain in the PEX pipe during the expansion strokes of the tool head and/or (2) to avoid the induction of plastic deformation of the PEX pipe in regions of seal formation between the radial-inwardly facing surface of the PEX pipe and the radially-outward facing surface of the fittings (i.e., the ribs of the fitting). Although not limited to merely these aspects, the improved designs can incorporate replacing the traditional frusto-conical surface of the jaws with a continuously curved convex surface in the axial direction such that a sharp-edge of the frusto-conical shape does not dig into the inner wall of the pipe. Instead, a softer convex intermediate part of the jaw profile may initially engage the inner diameter of the pipe during expansion. Still yet, the profile of the jaws may be structured to limit the initial axial insertion depth of the jaws into the opening to prevent permanent deformation of the PEX pipe in the region where the seal with the rib of the fitting will be formed. The jaws might alternatively or additional have angularly-extending interdigitating teeth that help to inhibit the formation of axially-extending strain lines. While such expansion tool heads have been known to include interdigitating teeth, herein the structure of the teeth may be altered in a novel manner such that, near the tip of the jaws, the teeth form a true round profile in the retracted or closed position of the jaws and such that, near the base of the jaws, the teeth form a true round profile in the extended or opened position of the jaws. This hybrid profile in which the profile of the teeth vary over the axial distance can be advantageous to avoid the possibility that the teeth at the tip end dig into the walls of the PEX pipe during the initial expansion step (as might be the case if they were true round in the fully opened position of the jaws).

Still further, these new expansion tool head geometries may stretch the pipe less at the region outside of the area covered by an expansion ring, thereby allowing for a fitting to be inserted with less potential damage/strain on the pipe adjacent to the fitting. This can also have the benefit of reducing the time it takes for the fitting to shrink back on the pipe.

Still yet another improvement may be that, because of the continuously curved convex geometry or shape, it may be more difficult to force the tool into the pipe (effectively, avoiding an initial over-insertion condition of the tool head in the pipe which, upon expansion could result in immediate and drastic over-expansion of the pipe at a rate and amount exceeding what the first expansion should entail). Instead, the tool head can be ensured to more gradually perform the work appropriate to induce the strain on the pipe, rather than having the potential for over-insertion and over-expansion, especially at a first expansion step, which may damage the pipe.

According to one aspect, the expansion tool head includes a plurality of jaws arranged circumferentially around a central axis. Each of the jaws extends from a base end to a tip end and has a set of angularly-extending teeth. The teeth of each of the jaws interdigitate with the teeth of the circumferentially adjacent jaws. The jaws are movable between a retracted position in which the jaws are brought together with one another and an expanded position in which the jaws are separated from one another. The jaws collectively provide a curved outer surface that has a profile which, notably, varies over an axial length of the jaws such that, when the jaws are in the expanded position, the curved outer surface of adjacent jaws are tangent to one another at a first axial position proximate to the base end and, when the jaws are in the retracted position, the curved outer surface of adjacent jaws are tangent to one another at a second axial position proximate to the tip end. Among other things, this can help to avoid axial stain from developing and further helps to avoid the teeth from plastically digging into the pipe at the tip end during the initial expansion stroke or strokes of the jaws.

According to another aspect, an expansion tool head includes a plurality of jaws extending from a base end to a tip end in which the jaws are again arranged circumferentially around a central axis. The jaws are movable between a retracted position in which the jaws are brought together with one another and an expanded position in which the jaws are separated from one another. According to this aspect, a curved outer surface collectively provided by the jaws tapers radially inward in the axial direction from the base end to the tip end in a continuous curve which is convex in form (at least in part) relative to the central axis of the jaws. With such a convex continuous curved profile of the jaws, an edge at the axial end of the jaw can be inhibited from digging into the material of the pipe, especially upon the first expansion stroke.

According to yet another aspect, a method for expanding an axial end of a pipe to accommodate reception of a fitting is disclosed in which the fitting has an abutment flange for positioning the axial end of the pipe on the fitting and a rib for making a sealed connection in which the rib that is separated from the abutment flange by a pre-established distance. A tip end of an expansion tool head is inserted into the axial end of the pipe. Notably, the expansion tool head includes a set of jaws that are collectively shaped with respect to an opening of the pipe in order to limit an insertion distance of the tip end of the expansion tool head into the axial end of the pipe to an amount less than the pre-established distance between the abutment flange and rib. The jaws are then actuated to move the jaws outward from a retracted position (in which the jaws are positioned together with one another) to an expanded position (in which the jaws are separated from one another) thereby expanding the axial end of the pipe. By limiting the insertion depth of the jaws on the first stroke, it may be ensured that permanent plastic deformation of the PEX pipe does not occur in the region of the rib of the fitting.

It is contemplated that the various improvements to the geometric shape of the jaws may enable the tool have to have jaw actuation patterns different than jaw opening patterns which are equally radial over the axial length. Instead, with the geometries described herein, it is contemplated that, over the actuation used to expand to the jaws, the tip end of the tool may remain together while the base end of the jaws are separate from one another. The tip end could remain together entirely, or simply be actuated outward to a lesser extent than the base end. This style of expansion (i.e., in which the separation of the base end of the tool exceeds that at the tip end) can mean that the expansion of the pipe can be more localized to the axial length over which the fitting will be received (i.e., the axial end alone without extending deeper into the tube) and can mean that expansion tool head may achieve the objective of the expansion with a reduced number of expansions.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE FIGURES

FIG. 7A shows an expansion in which the jaws are moved outward in a nearly purely radial translational fashion, while FIG. 7B shows a variation in which the tip ends remain substantially together while the base ends are separated, and FIG. 7C shows another variation in which both the base ends and the tip ends of the jaws are separated radially from one another but the extent of separation of the tip ends from one another are less than the base ends.

FIG. 10A shows a jaw actuator with a conical profile and a narrow rounded tip. FIG. 10B shows a jaw actuator with a conical profile and a wide rounded tip.

FIG. 11A is a cross section taken near the tip end of the jaws. FIG. 11B is a cross section taken near the base end of the jaws.

DETAILED DESCRIPTION

Embodiments of the disclosure may be further understood with reference to the figures.

Figure 1:
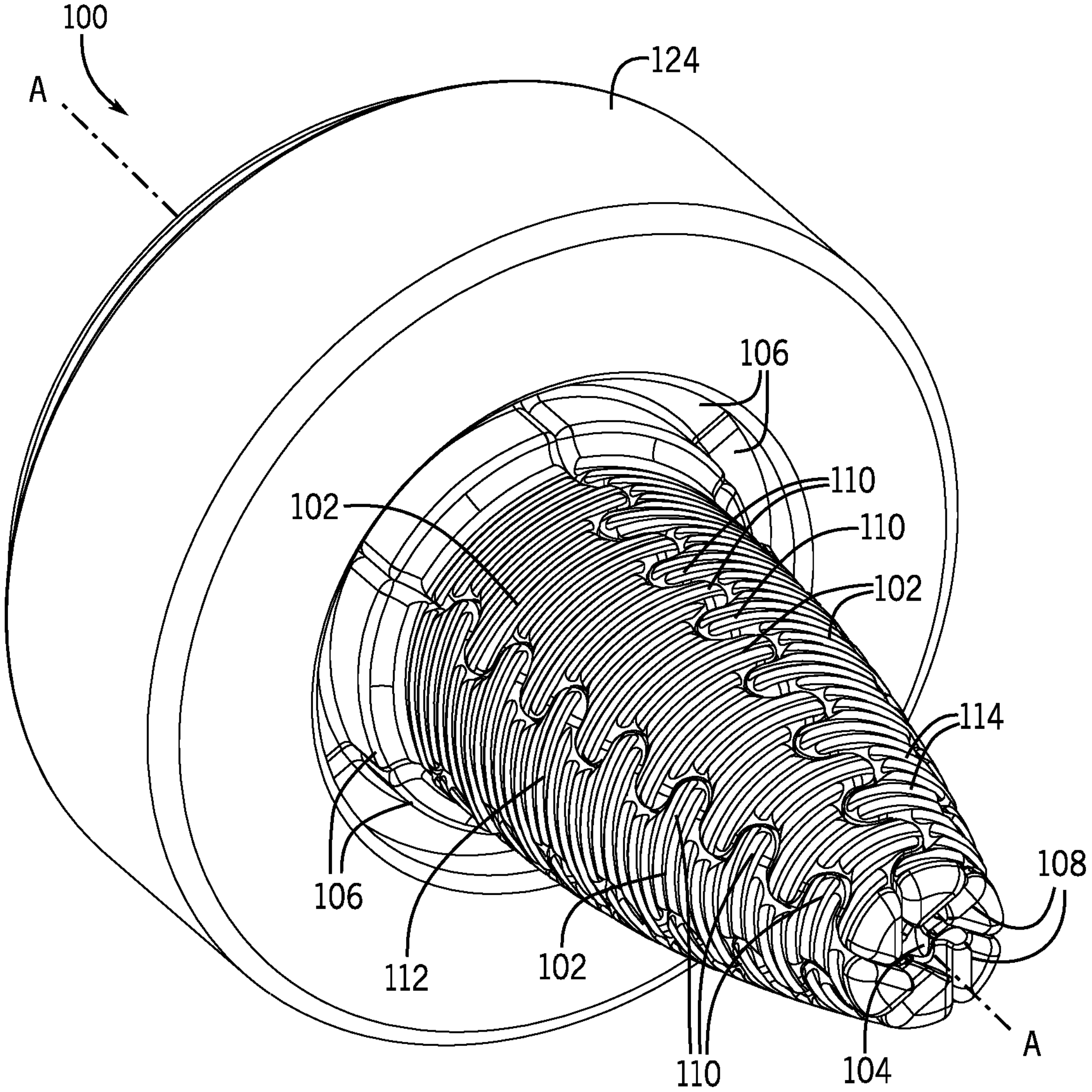
FIG. 1 is perspective view of an expansion tool head having a hybrid profile with interdigitated teeth in a closed or retracted position.
Figure 4:
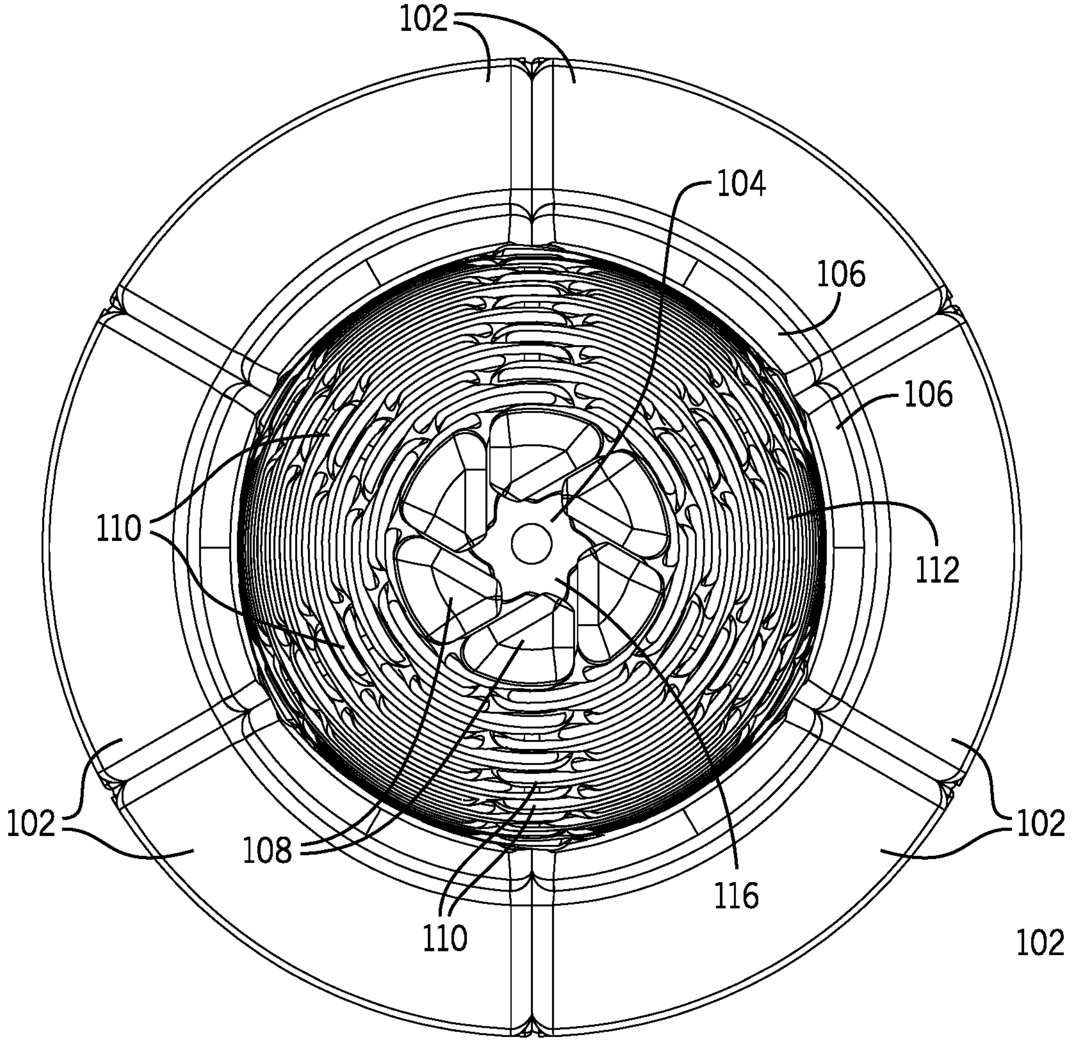
FIG. 4 is a top-down view along the central axis of the expansion tool head of FIG. 1 in a retracted or closed position.
Figure 5:
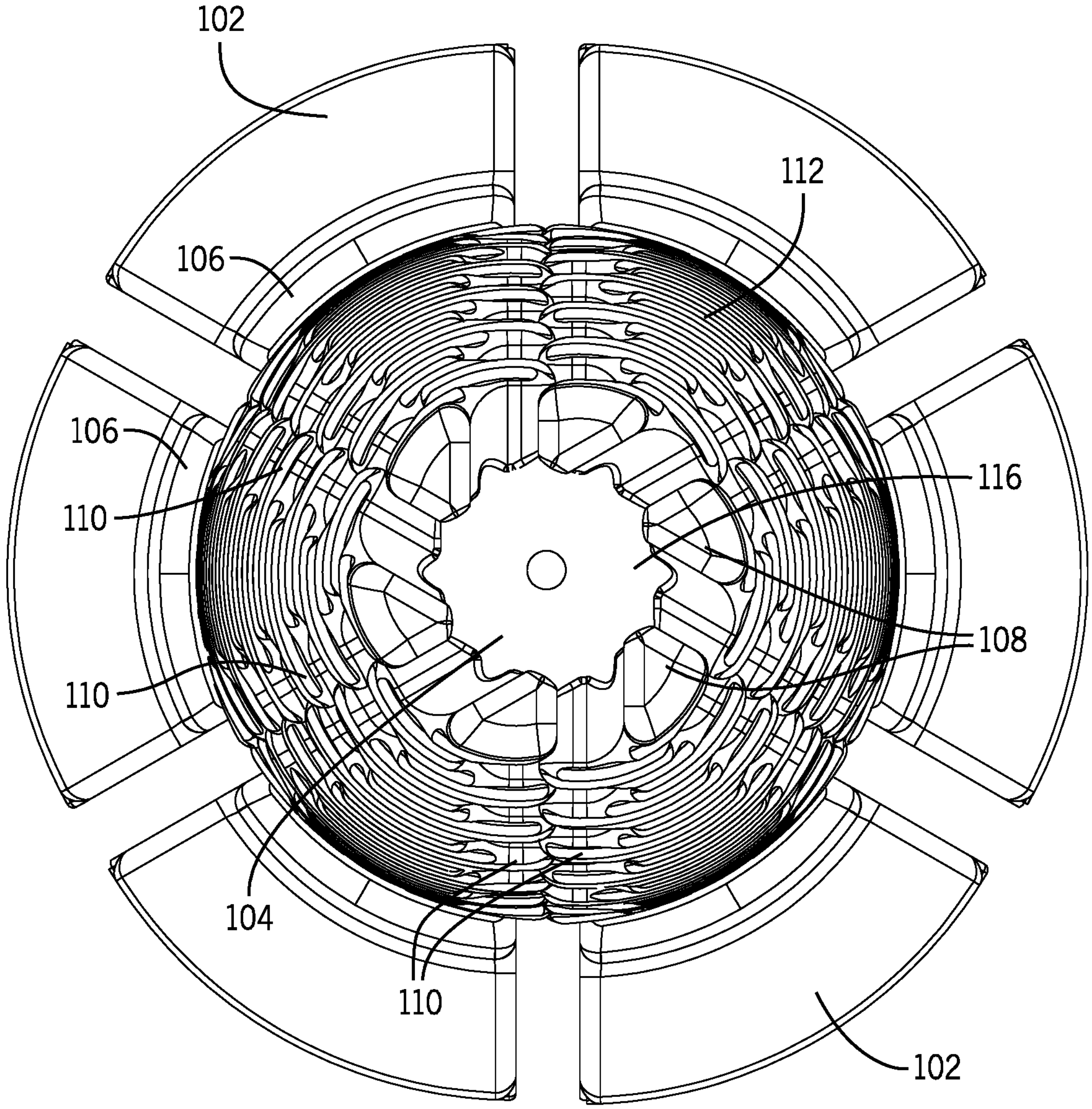
FIG. 5 is a top-down view along the central axis of the expansion tool head of FIG. 1 in an expanded or opened position.
Figure 9:
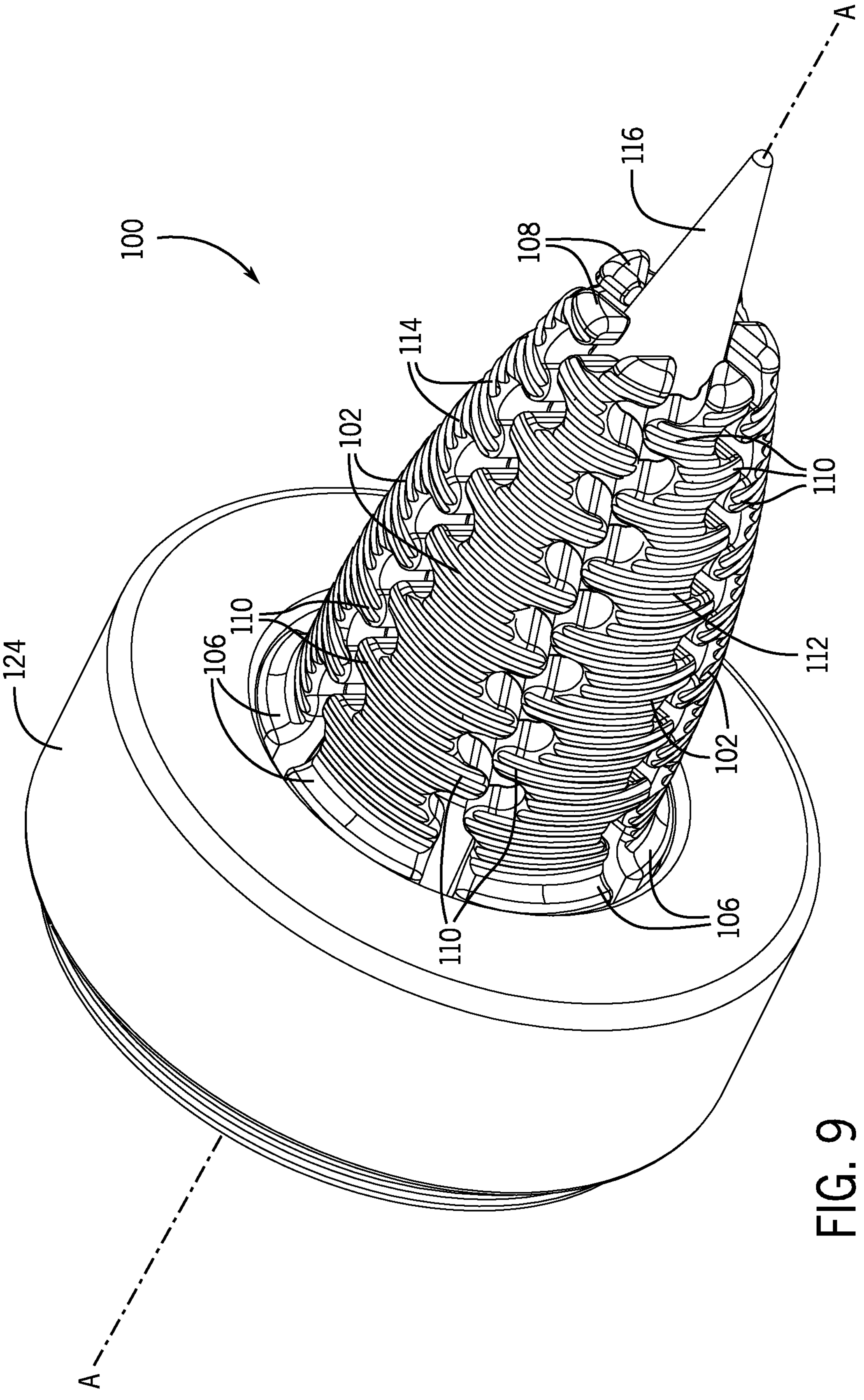
FIG. 9 is a perspective view of the expansion tool head of FIG. 1 in an open or expanded position.

FIG. 1 illustrates an exemplary embodiment of an expansion tool head 100. The expansion tool head 100 includes a plurality of jaws 102 arranged circumferentially around a central opening 104 and a central axis A-A. The jaws 102 each extend from a base end 106 to a tip end 108, and are movable between at least two positions—a retracted position as shown in FIGS. 1 and 4 and an expanded position as shown in FIGS. 5 and 9. As illustrated, the expansion tool head 100 includes six identical jaws 102; however, in other expansion tool heads, there may be other multiples of jaws.

Figure 2A:
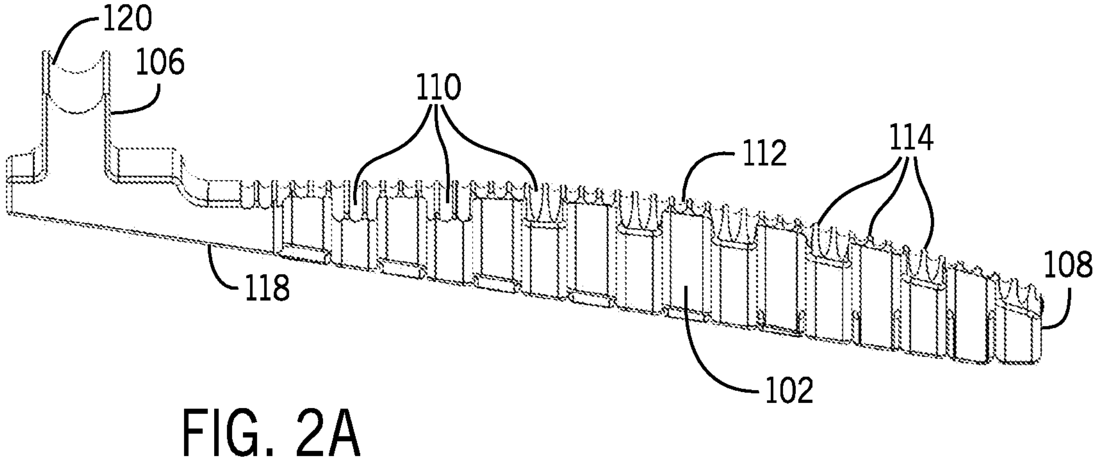
FIGS. 2A and 2B are side views of a single jaw of the expansion tool head of FIG. 1.
Figure 2B:
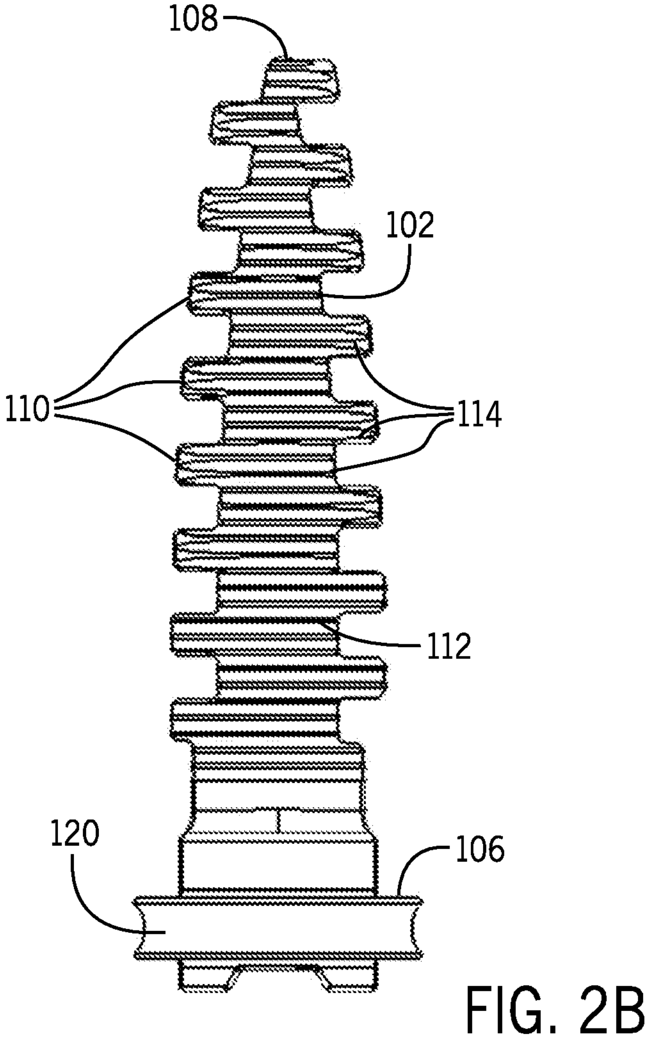

Illustrated in additional detail in FIGS. 2A and 2B, each of the jaws 102 include a plurality of angularly-extending teeth 110 disposed along an axial length of each jaw 102 between the base end 106 and the tip end 108. The teeth 110 are arranged in a repeating, alternating pattern in which the teeth 110 alternately extend from the jaw 102 in a first angular direction then extend from the jaws in a second, opposite angular direction, and so forth as one travels down the axial length of the jaw 102. The tooth 110 placement pattern is substantially identical on each of the jaws 102 such that the teeth 110 on each jaw 102 interdigitate with the teeth 110 of the circumferentially-adjacent jaws 102. In other non-limiting embodiments, the teeth 110 can be arranged in alternative patterns or directions or the jaws may be differently-shaped, but still complimentary with one another.

Referring back to FIG. 1, the jaws 102 collectively provide a curved outer surface 112 which faces outward and away from the central axis A-A. In some embodiments, a profile of the curved outer surface 112 varies over at least a portion of the axial length of the jaws 102, while in other embodiments a profile of the curved outer surface may remain constant over a portion of the axial length of the jaw. As illustrated in all of the illustrated jaws, the curved outer surface tapes radially inward in the axial direction (from base end 106 to tip end 108) so that the curved outer surface on any particular jaw forms a continuous curve which is generally convex in shape (save for any de minimus circumferential ridges 114). Because any ridges 114 are circumferential, in the depicted embodiments, they necessarily have sections on all of the jaws 102 (in this case, all six of the jaws) at the same axial position. In other embodiments, however, it is contemplated that circumferential ridges may be omitted from the curved outer surface.

Figure 10A:
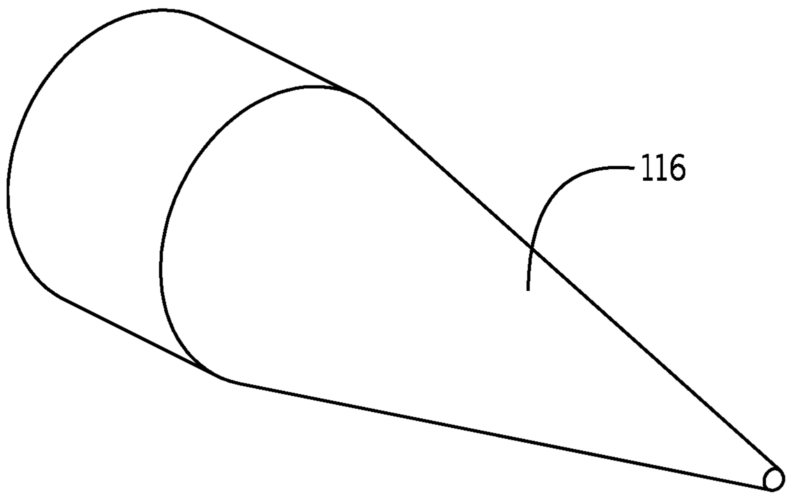
FIGS. 10A and 10B are perspective views of jaw actuators for moving an expansion tool head between a retracted position and an expanded position.
Figure 10B:
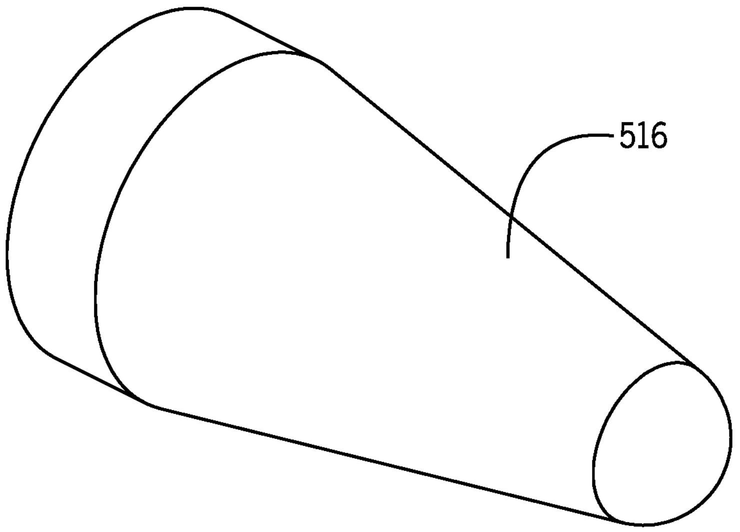

To move the expander tool head 100 between a retracted and an expanded position, the tool upon which the expander tool head 100 is attached further includes a jaw actuator 116 (as shown in FIG. 10A. In the embodiment illustrated, the jaw actuator 116 is a conical spindle positioned concentrically with the central axis A-A and the central opening 104. The conical spindle or jaw actuator 116 is axially translated into the central opening 104 and into contact with a cooperating inner surface 118 of the jaws 102. The conical spindle or jaw actuator 116 pushes the jaws 102, at least in part, radially outward and away from the central axis A-A into an expanded position, as shown in FIG. 5. In the expanded position, each of the jaws 102 are angularly separated from circumferentially-adjacent jaws 102. In some embodiments, an alternative jaw actuator can be used. For example, FIG. 10B shows a jaw actuator 516 with a blunt tip that is wider and rounded with a larger radius than the tip of the jaw actuator 116 of FIG. 10A. Some embodiments can include other jaw actuators that are differently sized or differently shaped than the illustrated jaw actuators.

To help delimit the range of motion during expansion of the jaws 102 and with further reference being made to FIGS. 1-2B, the base end 106 of the each of the jaws 102 includes a groove 120 and can be surrounded by a retention bracket or restrictive collar 124 which is attached to the tool.

Figure 13:
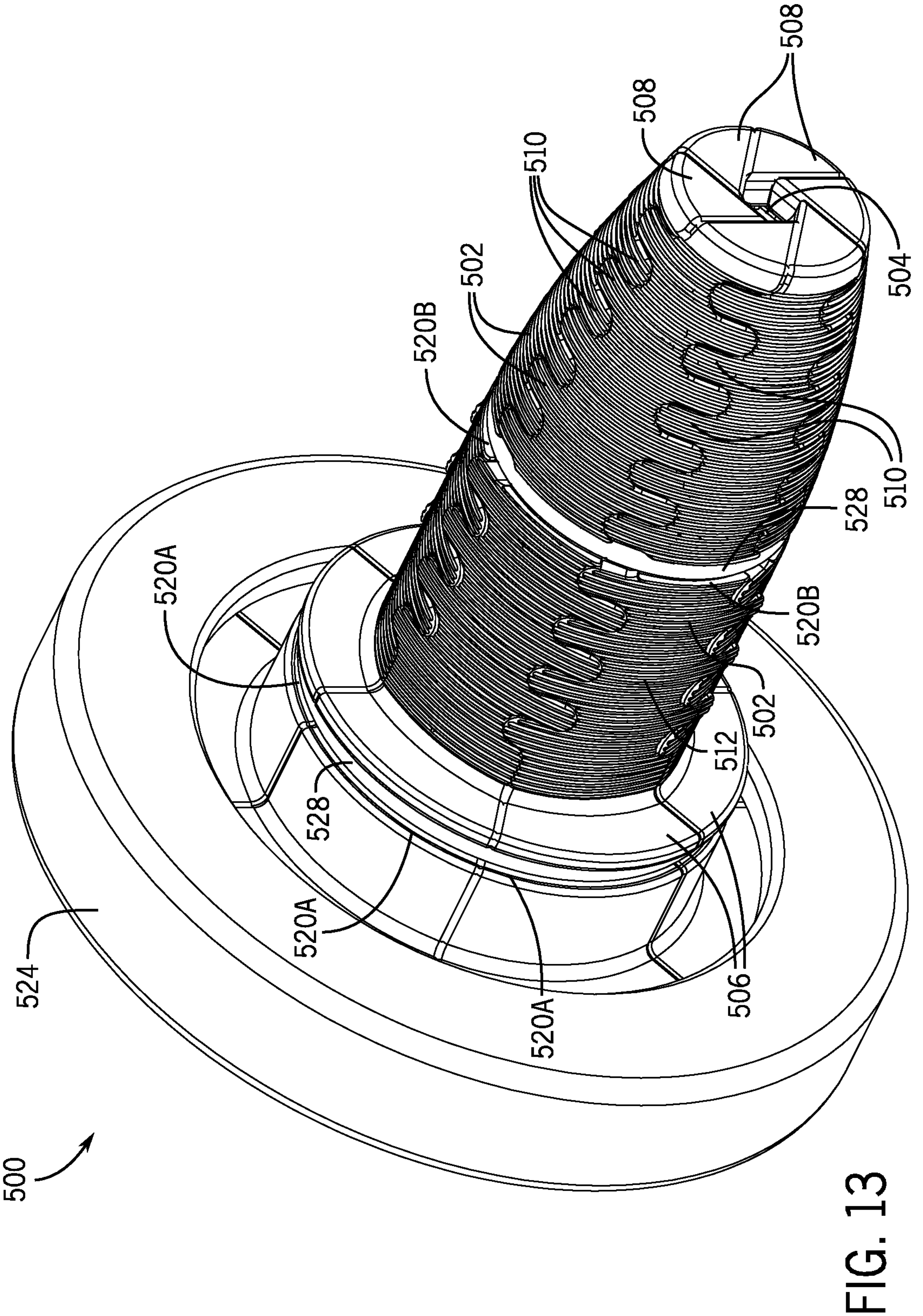
FIG. 13 is perspective view of an expansion tool head having a hybrid profile with interdigitated teeth in a retracted position and a positioning band between the tip and the base of the jaws.

The groove 120 which is arranged perpendicular to the central axis A-A and centered thereabout and is configured to receive a positioning ring or band (see, e.g., the band 528 in another embodiment illustrated in FIG. 13) to ensure that the jaws 102 are connected or bundled to one another at the base end 106 to prevent or inhibit separation at that location. The positioning ring can be elastic and biases the jaws 102 into a retracted position shown in FIGS. 1 and 4. In the retracted position, each of the jaws 102 are drawn toward the central axis A-A and one another, such that in the illustrated form of FIGS. 1, 2A, 2B, 4, 5, and 9, the teeth 110 of the jaws 102 are positioned together so that there are substantially no gaps in-between the jaws 102. In this position, the circumferential ridges 118 proximate the tip end 108 form a continuous ridge around the curved outer surface 114.

To hold this bundled group of jaws 102 on the greater tool, a retention bracket or restrictive collar 124 can be positioned proximate the base end 106. This collar 124 can both secure the jaws 102 on the tool and can be further configured to restrict axial or tilting movement of the jaws 102 during their expansion.

As the jaws 102 move from the retracted position to the expanded position by engagement with the jaw actuator or conical spindle 116 with the cooperating inner surfaces 118, each of the jaws 102 are moved outward relative to the central axis A-A such that the jaws 102 and the tip end 108 of each of the jaws 110 most dramatically are moved radially outward and away from each other. This will be used to expand the inner surface PEX tubing. Then, when the jaw actuator or conical spindle 116 is retracted, the positioning ring in the groove 120 biases the jaws 102 inward to the retracted position drawing the jaws 102 together again.

During the expansion of PEX tubing, this expansion and retraction can happen in various times in progression. Between each expansion stroke, the tool can be designed such that the jaws 102 can rotate between each expansion stroke. In this way, the strain induced by each expansion step can be distributed over different parts of the volume of the PEX material.

Having described the general shape of the jaws 102 from FIGS. 1, 2A, 2B, 4, 5, and 9, some of the advantages of the particular jaw geometry can now be described and appreciated. Most notably, the continuously curved convex surface from one axial end to the other can help to inhibit permanent deformation in the PEX material and a varying profile of the teeth 110 can help to distribute strain in non-linear fashion along axial lengths also without inducing undesirable plastic deformation.

First, given the convex, continuously curved surface from a region proximate the base end 106 to a region proximate the tip end 108 and over the axial length of the PEX-contacting area of the jaws 102, when the jaws 102 are opened or expanded, they contact the inside of the PEX tube in a manner such that a sharp edge is not dug into the wall of the tube. In some forms, this may mean that a rounded ring between the base end 106 and the tip end 108 first contacts the inside of the pipe in a non-destructive fashion. This may mean, for example, that in the expanded position, a radially outermost ring of the curved outer surface 112 is between the base end 106 and the tip end 108 and is not at a sharp edge or discontinuity that could destructively dig into the PEX material as would be the case in the standard frusto-conical jaw design. However, in other forms, a ring of contact between the tip end 108 of the jaws 102 and the inside of the PEX tube may occurs first, but that the convex profile will subsequently even out the localized deformation of the PEX material at the tip end 108.

With respect to the profile of jaws 102 over their axial length, the curved outer surface 112 of the jaws 102 and their respective teeth 110 differs or varies over the axial length. At a first axial position proximate the base end 106, the curved outer surface 112 of adjacent jaws 102 are tangent with one another when the jaws 102 are in the expanded position. However, as can be seen in FIG. 4 in the retracted position, the ends of those teeth 110 protrude radially outward. At a second axial position proximate the tip end 108, the curved outer surface 112 of adjacent jaws 102 are tangent only when the jaws 102 are in the retracted position. This structure can advantageously provide that, in the expanded position, especially near the base end 106, the inside of the PEX pile can have a large amount of surface area contact with the jaws 102, including up to the angular edges of the teeth 110. However, as can be seen from FIG. 4, to achieve such a circular profile when expanded, in a less than fully expanded state, these teeth 110 can protrude and potentially could provide elements which cause undesirable deformation in the PEX material. To avoid this on the tip end 108 (which will engage the PEX while it is still in an initially undeformed state), the profile at the tip end can be circular in the retracted position, thereby preventing the possibility that the edges of the teeth piece or deform the PEX material.

Figure 3A:
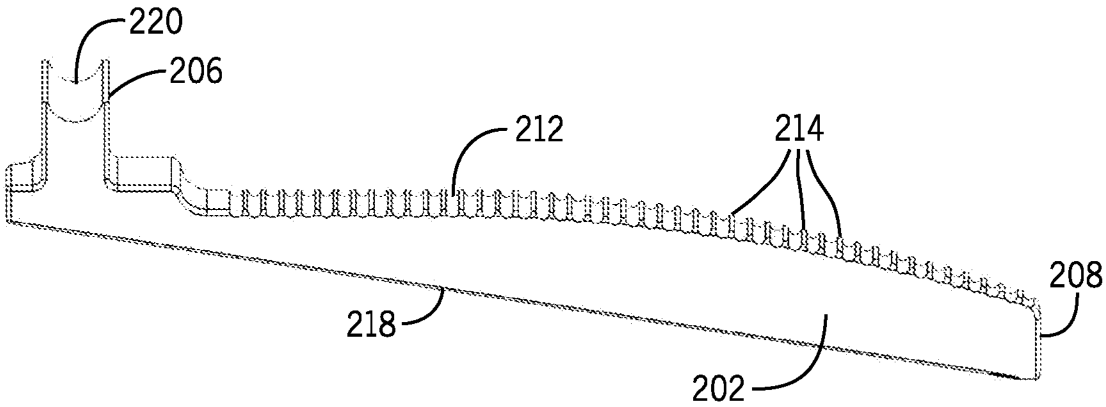
FIGS. 3A and 3B are side views of a single jaw of an expansion tool head different than that of the expansion tool head of FIG. 1 having no teeth, but a continuous curved convex shape type profile over its axial length.
Figure 3B:
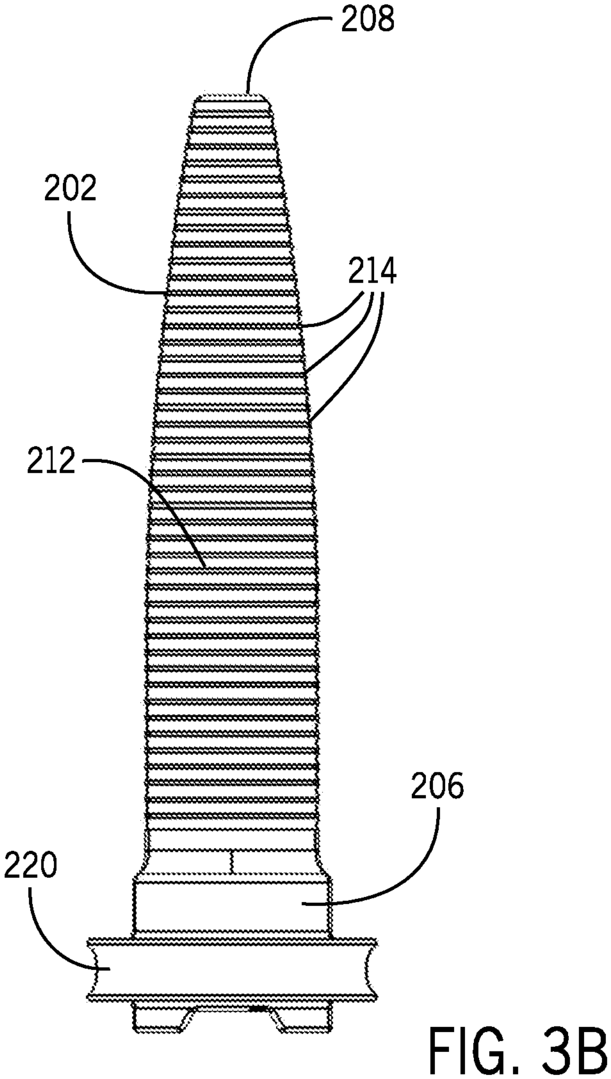

FIGS. 3A and 3B illustrate an alternative jaw 202 which might be used in place of jaw 102 in an alternative expansion tool head. The alternative jaw 202 is similar to jaws 102 in that it has a continuous curved surface from the base end 206 to the tip end 208 which is convex relative to the central axis. However, it does not include any teeth. As with the first embodiment, this second embodiment can help to avoid digging into the PEX material and its shape can prevent or limit insertion of the tool head into a pipe as will be described below. It is noted that all features on FIGS. 3A and 3B are labeled using the 200 series numbers and like numerals from the 100 series are used to denote like features described herein. For example, the jaw 202 includes a groove 220, an inner surface 218, and circumferential ridges 214.

Figure 14:
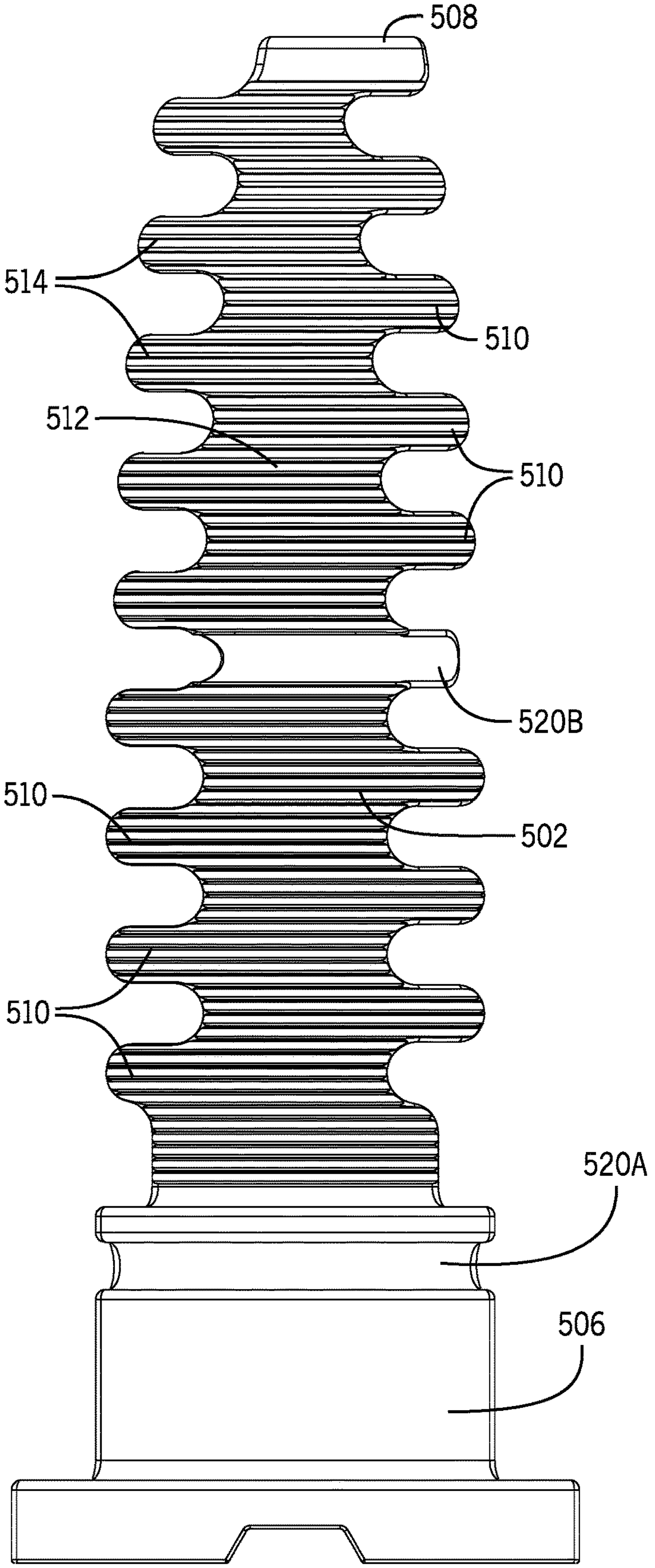
FIG. 14 is a side view of a single jaw of the expansion tool head of FIG. 13.

Additionally, FIGS. 13 and 14 illustrate an alternative expansion tool head 500 with a set of alternative jaws 502 that may be used in place of expansion tool head 100. The alternative expansion tool head 500 is similar to expansion tool head 100 in that is has a continuous curved surface from the base end 506 to the tip end 508 which is convex relative to a central axis. However, each jaw 502 includes a first groove 520*a* positioned proximate the base end 506 and a second groove 520*b* positioned proximate between the base end 506 and the tip end 508. Each of the grooves 520*a*, 520*b* is configured to receive a positioning ring 528 for biasing the jaws 502 into the retracted position. The use of additional positioning rings can help to bias differently sized or shaped jaws into a retracted position, and can help limit the movement of the jaws as the jaws move into an expanded position. It is noted that all features on FIGS. 13 and 14 are labeled using the 500 series numbers and like numerals from the 100 series are used to denote like features described herein. For example, the jaw 502 includes a collar 524, a curved outer surface 512, teeth 510, and circumferential ridges 514.

Figure 11A:
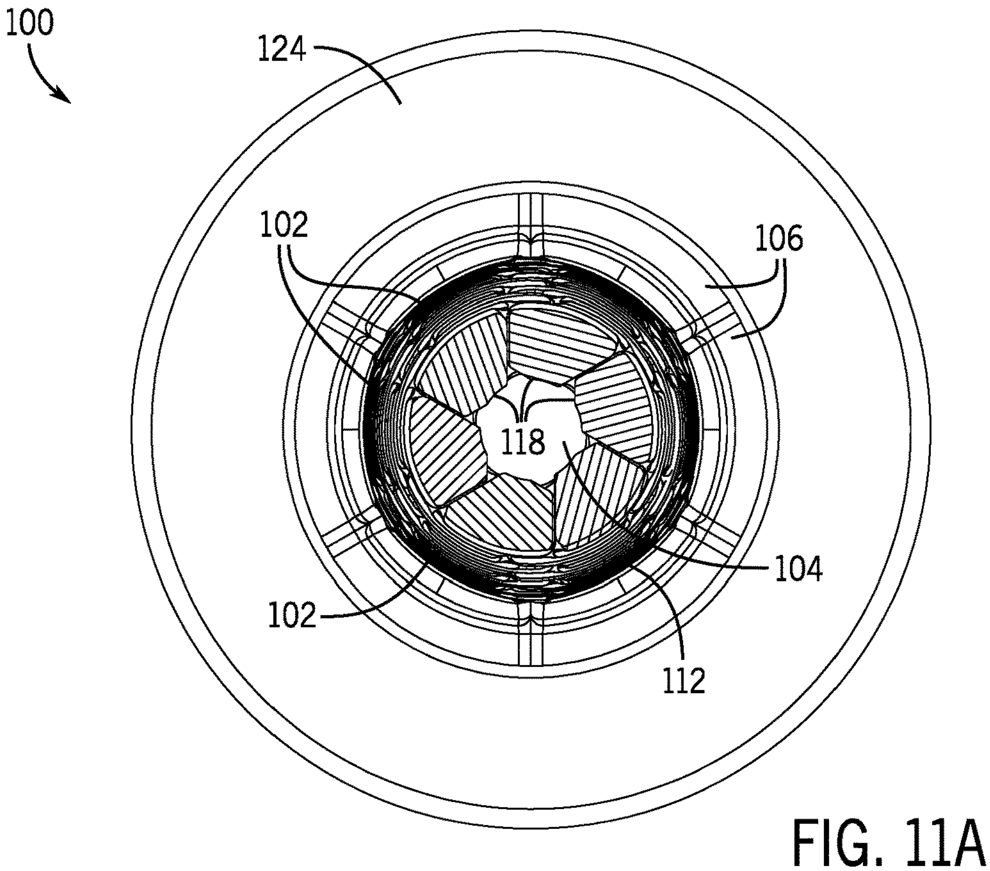
FIGS. 11A and 11B are cross-sectional front views of an expansion tool head without the jaw actuator in which the expansion tool head is in the retracted position.
Figure 11B:
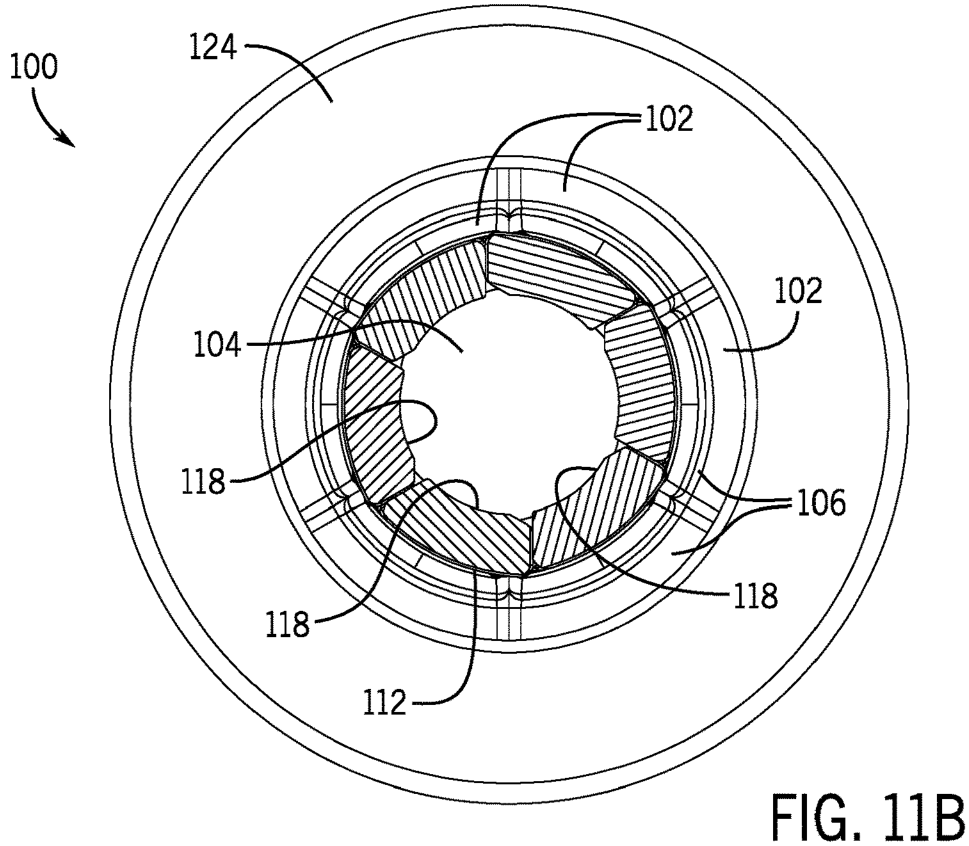
Figure 12A:
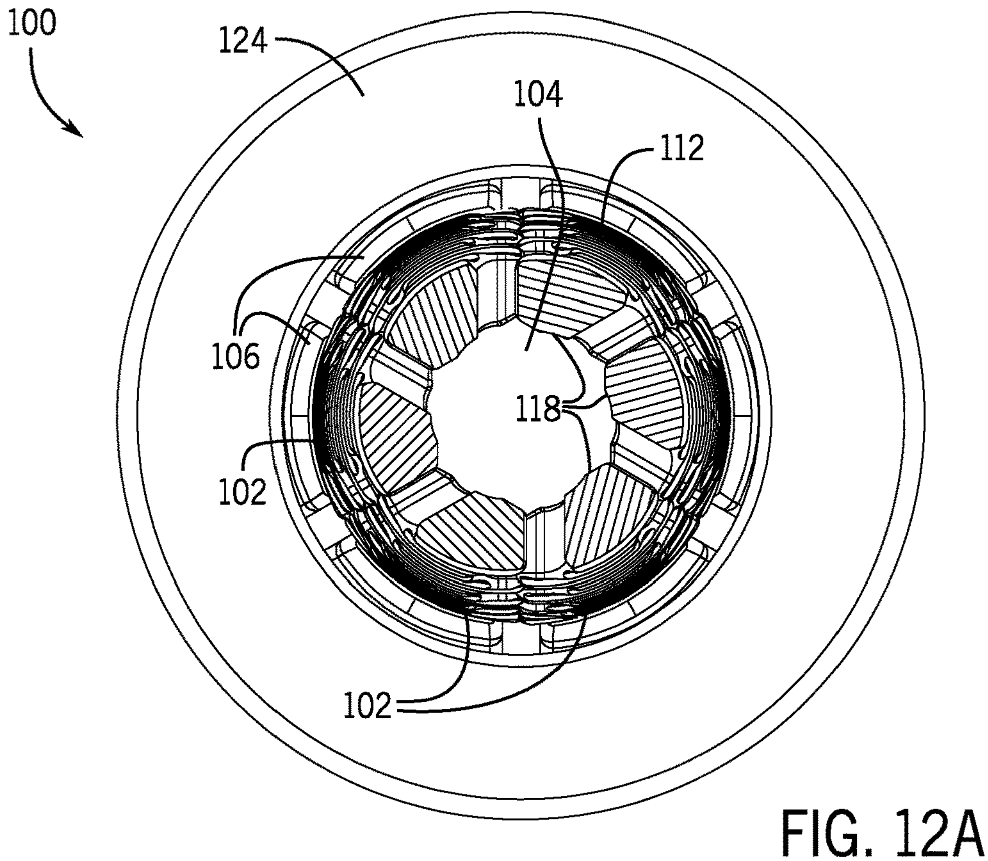
FIGS. 12A and 12B are cross-sectional views of the expansion tool head of FIGS. 11A and 11B, but in which the jaws have been moved to an expanded position.
Figure 12B:
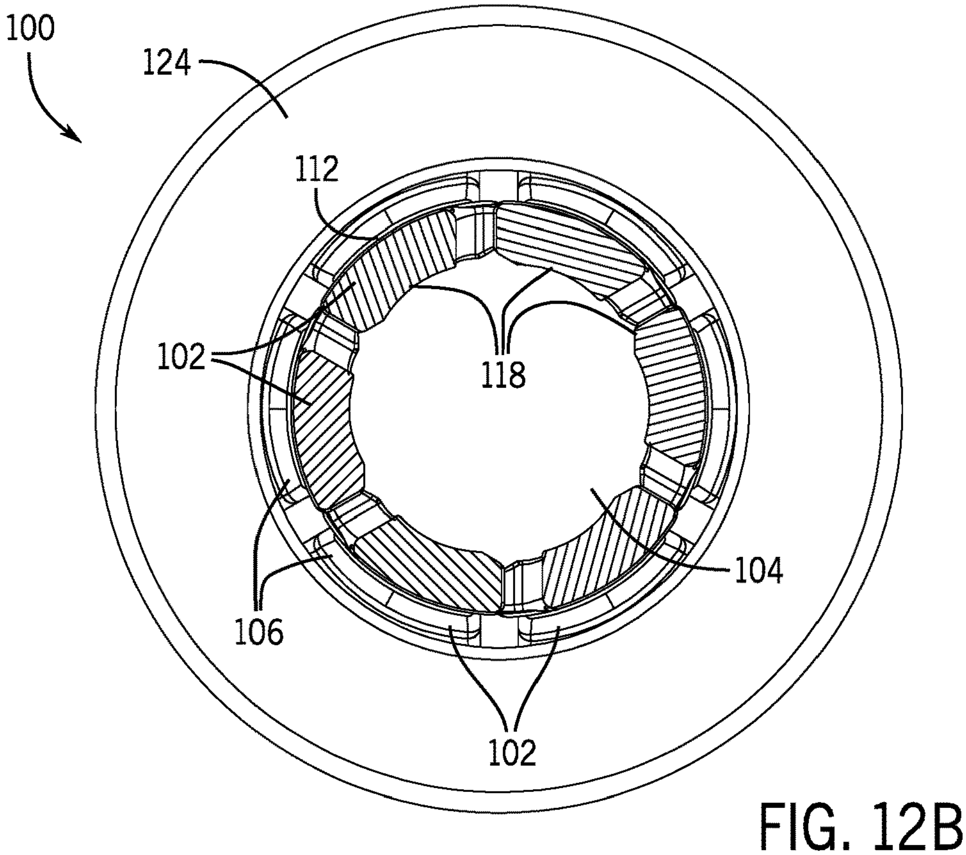

With reference to FIGS. 4, 5, and 11A-12B it can be seen that the profile of the curved outer surface 112 of the jaws 102 can be shaped such that the profile is true round in sections in the closed position—as can be seen by the true circle at the tip end in FIGS. 4 and 11A—and/or true round (save for any gaps between the teeth) in the opened position—as can be seen by the true circle at the base end in FIGS. 5 and 12B.

As illustrated this "true round" condition includes the entirety of the outer surface of the jaws including the radially-outward facing surface of any teeth. Because the tool head of FIGS. 4, 5, and 11A-12B is a hybrid design in which the cross-sectional profile varies over the axial length, it includes both true round configurations in different axial sections in both the opened and closed position of the jaws. It is noted that, when true round is achieved in the extended position and there are interdigitating teeth, these teeth may protrude or stick out from the outer surface in the retracted position as illustrated with the base end teeth in FIGS. 4 and 11B. Although seemingly harsh-looking, because these protrusions disappear as the tool head opens, they are harmless to the inside of the pipe.

Numerous variations are contemplated as to when alternative forms of jaws can be true round. For example, all or some of the outer surface could be true round either in the retracted or the extended position. Of course, when a section is true round in one of those positions, it will not be in the other. Still further, as the actuation modality of the jaws can varied (as is illustrated between FIG. 6 and the alternative extended positions in FIGS. 7A-7C), the outer surface profile may be varied such that true round is only achieved in the final opened expanded position on some or all portions of the surface of the jaws based on the desired orientation and configuration of the jaws. Still further, the true round condition could be present on jaw designs have convex curved surfaces over their axial lengths or on jaws having merely straight profiles in either the opened or closed position of the jaws.

FIGS. 6 and 7A-7C schematically illustrate various potential operating positions of the expansion tool head in use to expand a PEX pipe 300 using an expansion tool head employing jaws like jaws 200 above illustrated in FIGS. 3A and 3B.

Figure 6:
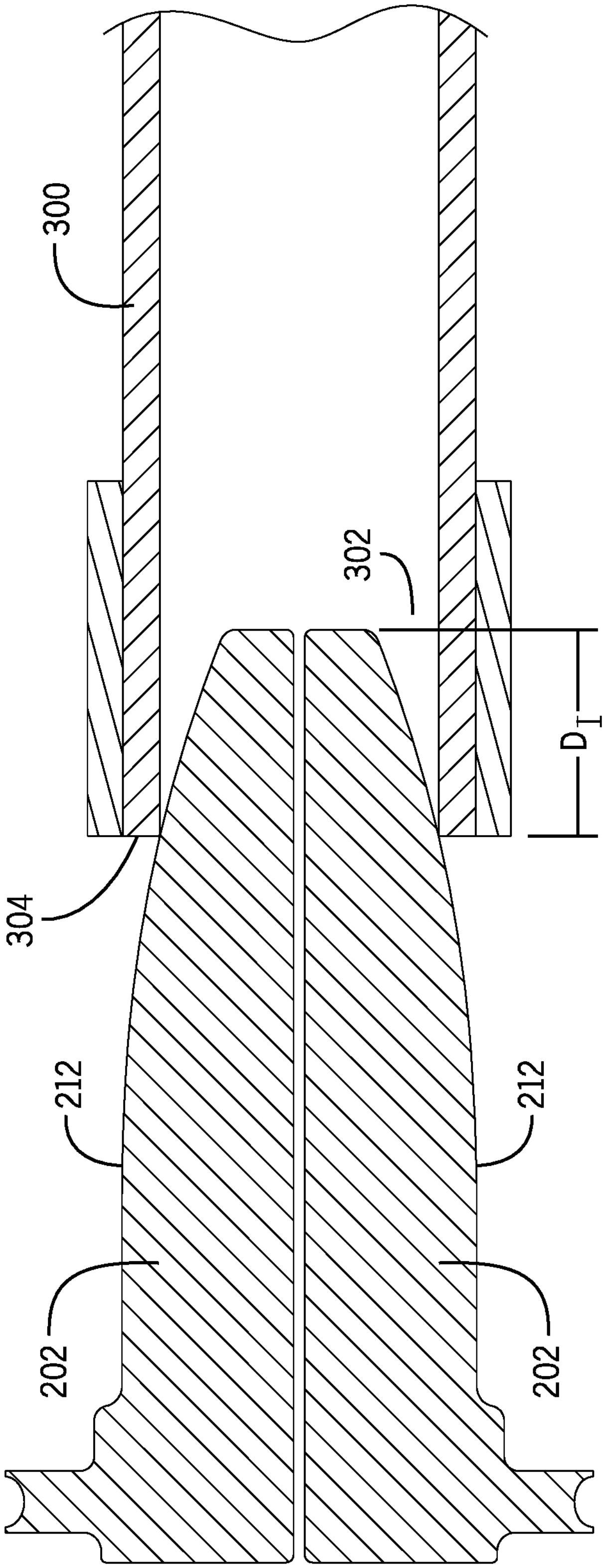
FIG. 6 is a cross-sectional side view of an expansion tool head incorporating the jaws of FIGS. 3A and 3B in which the expansion tool head is in the retracted position in which it is initially positioned within a PEX pipe before expansion.
Figure 8:
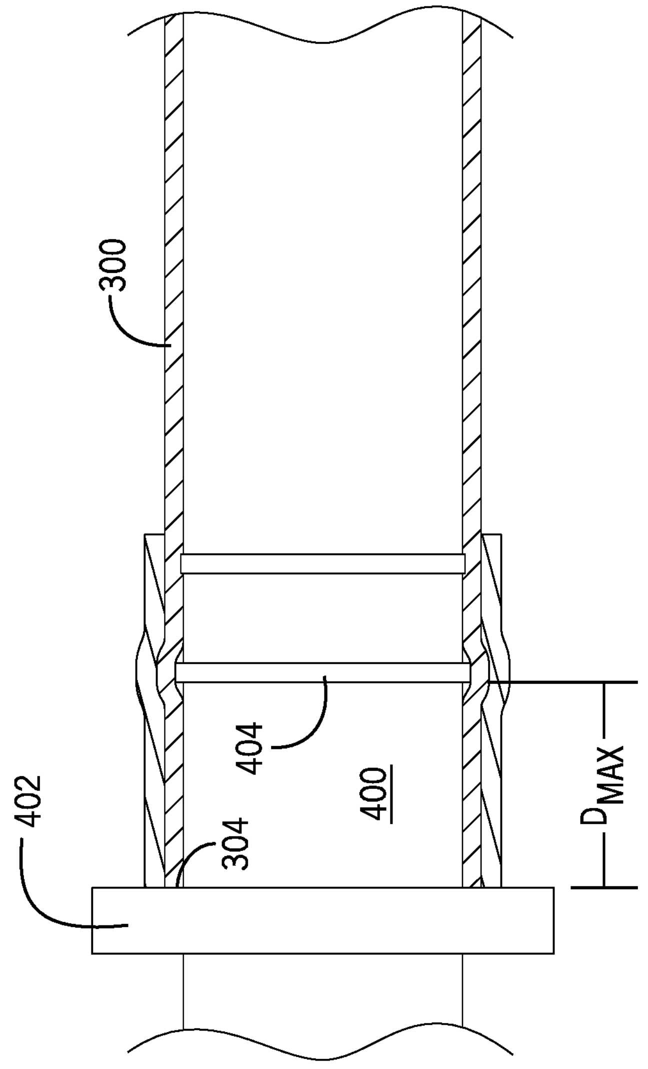
FIG. 8 is a cross-sectional view of a PEX pipe having been expanded from FIGS. 6 and 7 after return towards its initial size to form a water-tight seal with a fitting.

In FIG. 6, the jaws 202 of the expansion tool head have been inserted into an opening 302 of an axial end 304 of the PEX pipe 300 and the jaws 202 are in the retracted position. As illustrated, axially-facing surface of the axial end 304 is in contact with the curved outer surface 212 at a contact ring on the continuous curve. The particular set of jaws 202 and expansion tool head should be selected such that the initial distance $D_I$ (i.e., the distance from the axial end 304 to the tip end 204 of the jaws 202) is less than the pre-established distance $D_{MAX}$ (e.g., as illustrated in FIG. 8) from the abutment flange 402 of the fitting 400 to the rib 404 of the fitting. This limit on insertion depth precludes any part of the jaws 202 from plastically deforming the inside of the PEX pipe 300 in a region that will be compressed around the rib 404.

Figure 7A:
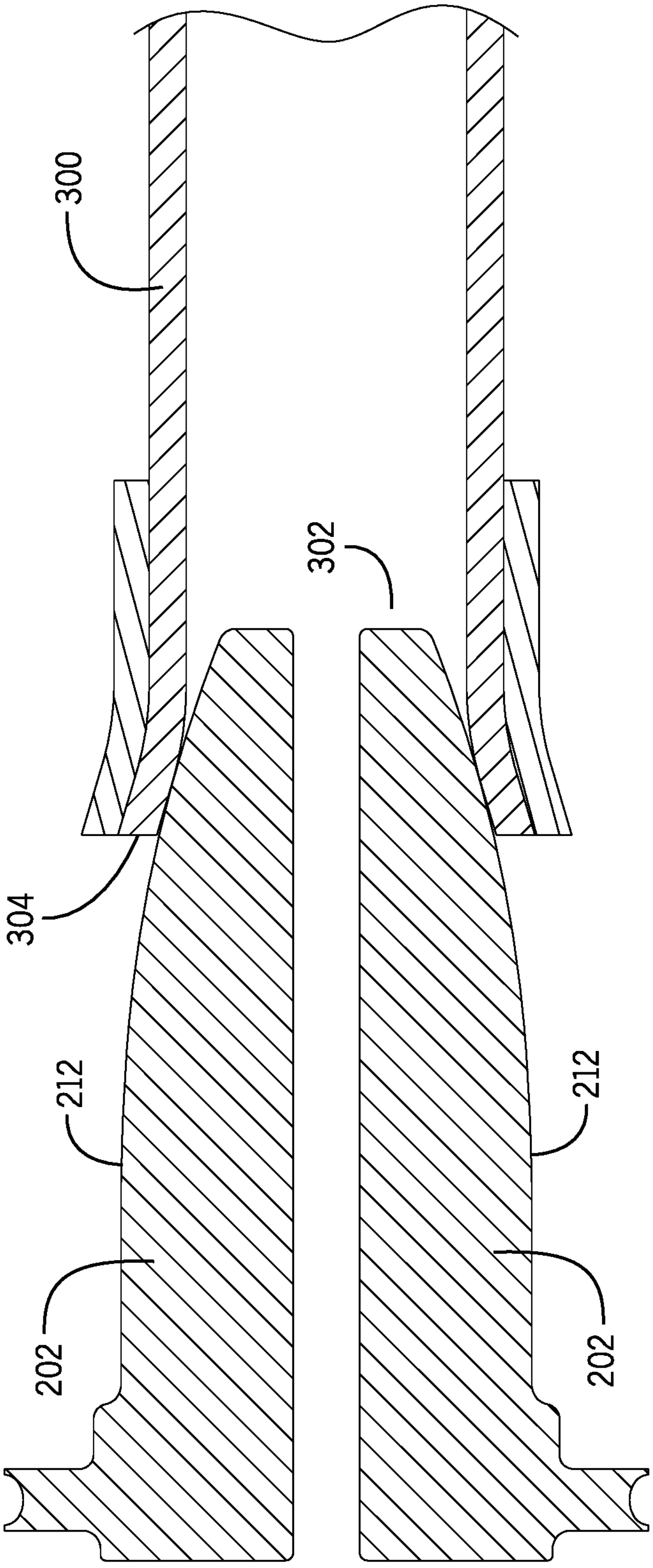
FIGS. 7A-7C are cross-sectional views of the expansion tool head within the PEX pipe as in FIG. 6, but in which the jaws have been moved to an expanded position within the PEX pipe to expand it.
Figure 7B:
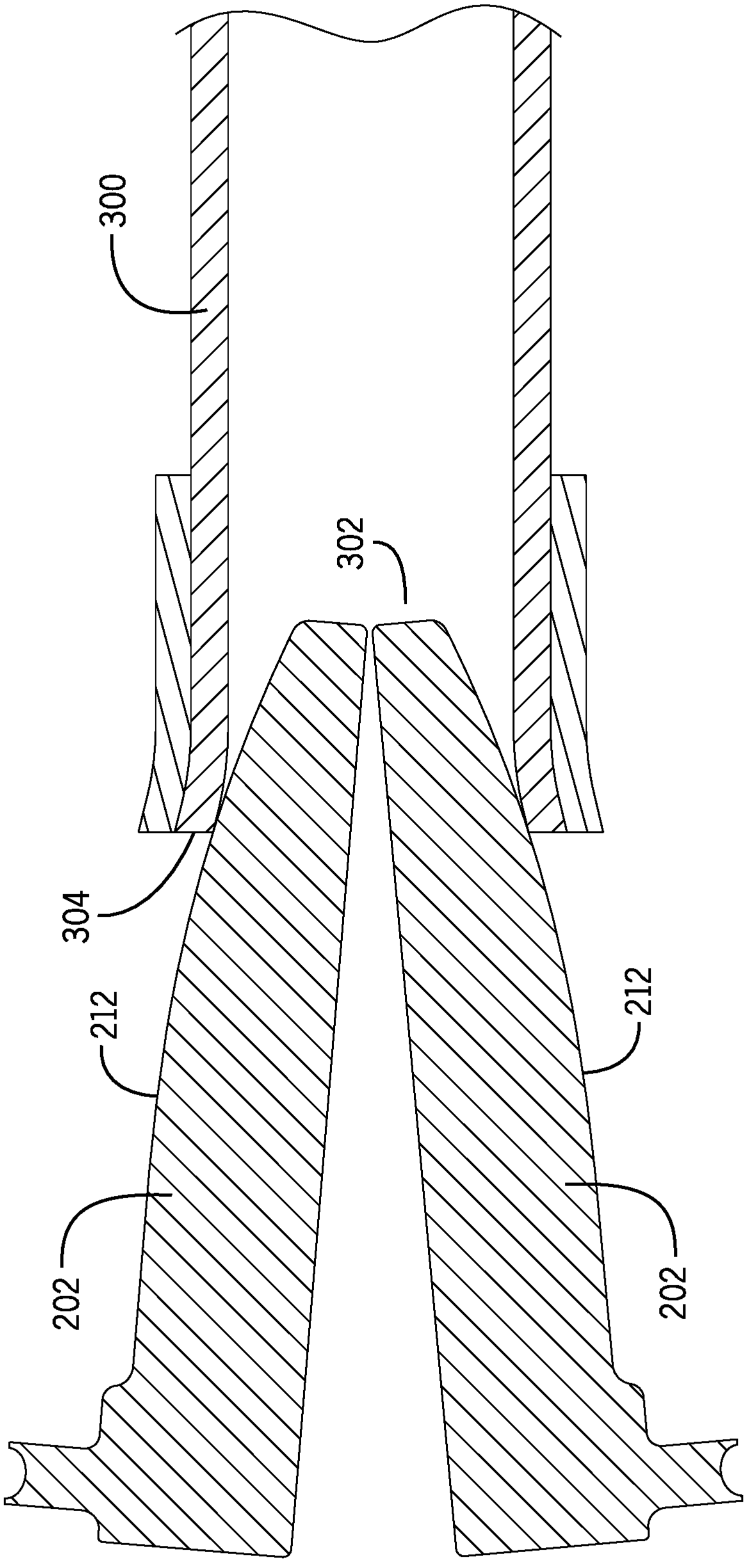
Figure 7C:
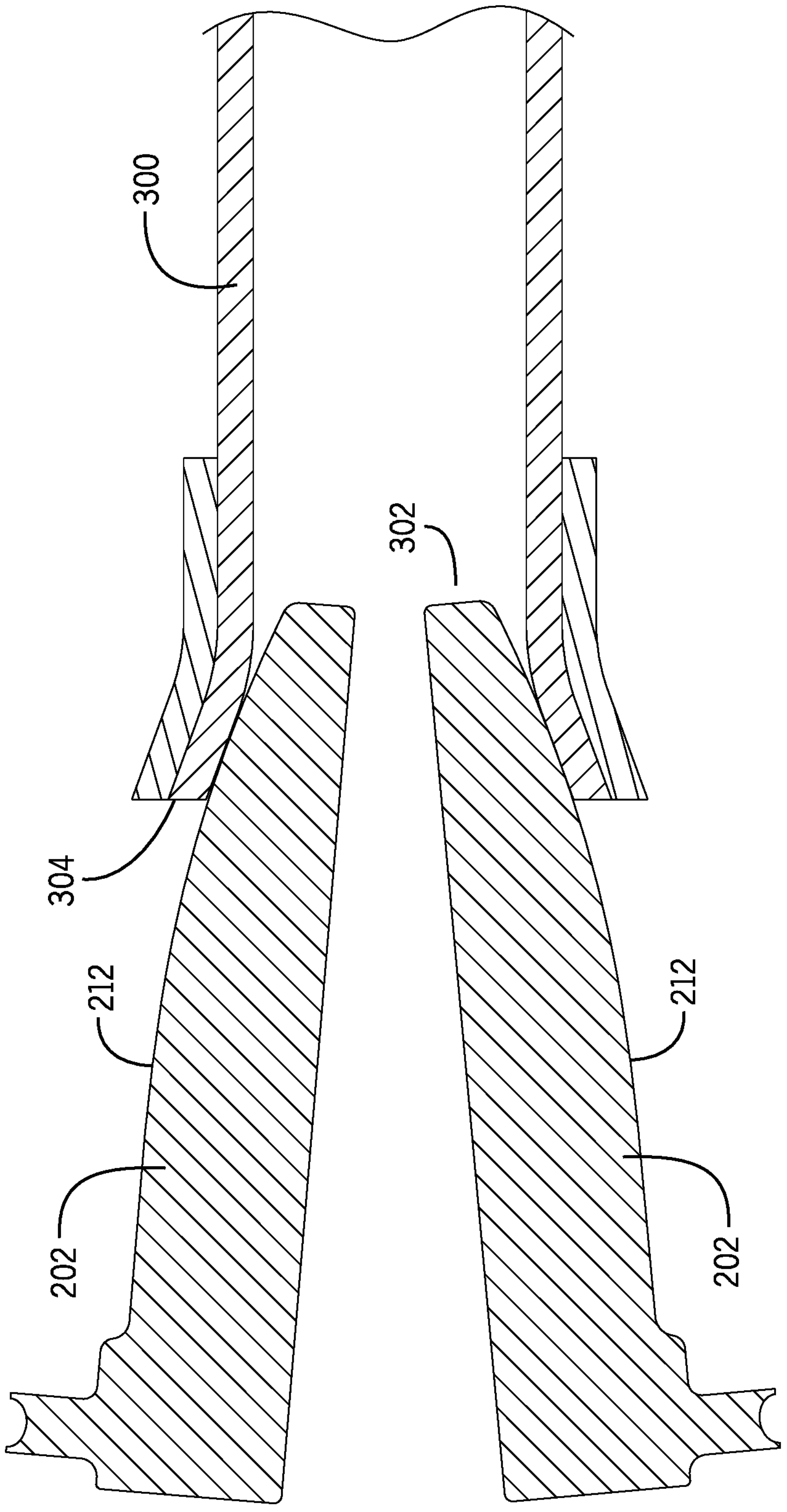

Looking at FIGS. 7A-7C, the jaws 202 are shown in an expanded state in which the jaws 202 have been used to enlarge the opening 302 proximate the axial end 304 of the PEX pipe 300. As noted above, this expansion may happen in various iterative steps. Once the PEX tube 300 is expanded sufficiently, then the PEX tube 300 can be slid over the fitting 400 such that axial end 304 of the PEX tube 300 abuts an opposing axial face of the abutment flange 402 of the fitting 400. The expanded PEX material of the PEX tube 300 is then allowed to naturally return towards its original shape and dimensions over a duration of time (often on the order of magnitude of 10 seconds to a few minutes) to form a water-tight seal around the fitting 400.

Notably, the jaws 202 might be actuated from the inserted, retracted position of FIG. 6 to any of the expanded positions of FIG. 7A, 7B, or 7C. For the sake of clarity, the positions shown in FIGS. 7A, 7B, and 7C are not sequential, but rather are alternative final expanded positions for the jaws.

It can be seen that the primary difference between the positions illustrated in FIGS. 7A, 7B, and 7C are the manner in which the jaws 202 are expanded from one another. In the actuated position shown in FIG. 7A, the jaws 202 are simply translated radially outward such that the base end and the tip end of each of the jaws are equally translated away from the central axis. In this type of movement, the jaws in FIG. 7A are not rotated with respect to the central axis. In the actuated position shown in FIG. 7B, the jaws 202 are rotated such that the base ends are separated from the central axis while the tips of the jaws 202 remain together at the central axis. In the actuated position shown in FIG. 7C, the jaws 202 are rotated so that both the base end and the tip end are separated from the central axis, with the base end being separated to a greater extent than the tip end.

All of these actuation modalities of the jaws 202 can help to expand the tube 300 and compression collar in a more beneficial way for inserting the fitting 400 as will be depicted in FIG. 8. Notably, the curved profile and actuation modalities can help focus the deformation so that it that primarily occurs at the axial end (where the fitting will be inserted) rather than in a region past the compression collar which is less well-supported. Further, especially in the expansion positions illustrated in FIGS. 7B and 7C, the "tip in" configurations help to reduce the rate of expansion that the jaws 202 perform on the end of the pipe.

Referring now to FIG. 8, this connection between the fitting 400 and the recoiled PEX tube 300 is illustrated. Notably, the rib 404 protrudes outward from the fitting 400 to cause the primary seal and given the earlier stated limitation on tool insertion distance during the insertion and expansion stage, it can be ensured that no irreversible plastic deformation has occurred in this region.

While the expansion of PEX tubing using expansion tool heads having various geometric profiles have been described, it is contemplated that tubular materials other than PEX tubing could also be expanded using these expansion tool heads. For example, copper or other metal tubes may also be able to have axial ends thereof expanded using tool head geometries of this type.

While various representative embodiments of improved expansion tool head geometries have been illustrated, that many general principles are contemplated as being independently employable as well as in all workable permutations and combinations. For one, the improvement of a continuous curved convex shape is considered novel, especially as a means for limiting insertion depth into a pipe and enabling alternative actuation modes for the jaws. Such curved geometry could be widely employable in jaw sets having straight sides, sides with interdigitated teeth, or even other patterns (for example, spiral or helical jaws). Still further, the designs with interdigitating teeth could have a curved profile in the axial direction or a straight profile over their axial length.

For both designs incorporating interdigitating teeth and designs not incorporating interdigitating teeth, the working end of the jaws could have a profile in a cross-section taken perpendicular to the central axis that is circular when the jaws are closed or circular when the jaws are opened. A particular jaw could have such profiles (circular when opened or circular when closed) over all or just a part of the axial length and it is further contemplated that an expansion tool head can have a hybrid form in which it shifts from one type to the other type over the axial length of the tool head as depicted in FIGS. 1 and 13, for example.

Still further serrations or ridges may be present entirely over the working end of the jaws or over just a portion thereof (i.e., just proximate the tip). Again, such serration could be present on any of the various permutations from the variations apparent from the paragraphs above.

Still yet, it is contemplated that any of the three actuation modalities illustrated above in FIGS. 7A-7C could be used with these different types of jaw designs and permutations. It will undoubtedly be appreciated that certain of these actuation modalities can present advantages over others based on the usage context in which the expansion tool head is used and that, given a particular pipe diameter and actuation modality, the jaw might be engineered to include various ones of the these design aspects in a particularly advantageous manner. Thus, while this disclosure provides many representative jaw structures, the structures contemplated within this disclosure are not so limited.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A method of installing a fitting in a pipe having a first size, the method comprising:

providing a fitting with a size corresponding to the first size of the pipe, the fitting having an abutment flange and a rib for making a sealed connection, wherein the rib is separated from the abutment flange by a rib distance;

providing an expansion tool head including a set of jaws sized to correspond with the first size of the pipe, the set of jaws defining a tip end and a base end that is opposite the tip end, the set of jaws being circumferentially positioned about a central axis, and outer surfaces of the jaws having a continuously curved outer profile that protrudes in a convex manner outwardly from the central axis, the outer profile having a rounded shape extending in a direction along the central axis;

inserting the tip end of the expansion tool head into an axial end of the pipe, wherein the size of the set of jaws is configured to limit an initial insertion distance of the tip end into the axial end of the pipe to an amount less than the rib distance;

actuating the set of jaws with an actuator while the tip end is located at the initial insertion distance to move the set of jaws outward relative to the central axis from a retracted position to an expanded position thereby expanding the axial end of the pipe, wherein moving the jaws outward from the retracted position to the expanded position includes moving the base end of each jaw of the set of jaws by a first radial distance relative to a central axis, and moving the tip end of each jaw of the set of jaws by a second radial distance relative to the central axis, the second radial distance that the tip end moves being less than the first radial distance that the base end moves, and wherein, in both the retracted position and expanded position, the outer surfaces of the jaws maintain a true round cross-section relative to the central axis; and installing the fitting at the axial end of the pipe.

2. The method of claim 1, wherein, when the jaws are in the retracted position, a first profile of a curved surface collectively defined by the jaws is larger than the opening of the pipe at a first axial position proximate to a base end and a second profile of the curved surface is smaller than the opening of the pipe at a second axial position proximate to the tip end.

3. The method of claim 1, wherein the jaws each have a set of angularly-extending teeth interdigitating with the teeth of circumferentially adjacent jaws.

4. The method of claim 1, wherein a profile of a curved outer surface collectively defined by the jaws varies over an axial length of the jaws such that, when the jaws are in the expanded position, the curved outer surface of adjacent jaws are tangent to one another at a first axial position proximate to a base end of the jaws and such that, when the jaws are in the retracted position, the curved outer surface of adjacent jaws are tangent to one another at a second axial position proximate to the tip end.

5. The method of claim 1, wherein the curved outer surface of the jaws tapers radially inward in the axial direction from the base end to the tip end in a continuous convex curve.

6. The method of claim 1, wherein the pipe is PEX pipe.

7. The method of claim 1, wherein the pipe is copper.

8. The method of claim 1, wherein, when the jaws are actuated, the tip ends of each of the jaws remain in contact with one another while their base ends are radially displaced relative to the central axis.

9. The method of claim 1, wherein, when the jaws are actuated, each of the jaws are displaced radially outward relative to a central axis at their respective base ends while the tip ends remain in contact with one another.

10. The method of claim 1, wherein, when the jaws are actuated, each of the jaws are displaced radially outward relative to a central axis at their respective base ends and their respective tip ends, with a radial distance of separation between the respective base ends and the central axis exceeds a radial distance of separation between the tip ends and the central axis.

11. A method for expanding an axial end of a PEX pipe to accommodate reception of a fitting, the method comprising:

inserting a tip end of an expansion tool head into the axial end of the PEX pipe a first axial distance, the expansion tool head including a set of jaws circumferentially positioned about a central axis, wherein each jaw includes a base end and a distal end opposite the base end, outer surfaces of the jaws having a continuously curved outer profile that protrudes in a convex manner outwardly from the central axis, the outer profile having a non-linear shape extending in a direction along the central axis; and actuating the set of jaws with an actuator to move the set of jaws outward from a retracted position to an expanded position thereby expanding the axial end of the PEX pipe, wherein moving the jaws outward from the retracted position to the expanded position includes moving the base end of each jaw of the set of jaws by a first radial distance relative to the central axis, and moving the distal end of each jaw of the set of jaws by a second radial distance relative to the central axis, wherein the second radial distance that the distal end moves is less than the first radial distance that the base end moves, and wherein, in both the retracted position and the expanded position, the outer surfaces of the jaws maintain a true round cross-section relative to the central axis.

12. The method of claim 11, wherein actuating the set of jaws includes moving the distal ends of each jaw a second distance that is sufficient such that the distal ends are no longer in contact with each other.

13. The method of claim 1, further comprising the steps of:

actuating the jaws to move to the retracted position;

further inserting the expansion tool head into an additional section of the pipe; and actuating the jaws to again move to the expanded position thereby expanding the additional section of the pipe at a distance greater than the distance between the abutment flange and the rib of the fitting.

14. The method of claim 1, further comprising inserting the tip end into the expansion tool a second time, and wherein the tip end is inserted a second insertion distance that is greater than the rib distance.

15. The method of claim 14, further comprising actuating the jaws a second time to move the jaws outward from a retracted position in which the jaws are positioned together with one another to an expanded position in which the jaws are separated from one another thereby expanding the axial end of the pipe.

16. A method for expanding an axial end of a PEX pipe, the method comprising:

inserting a tip end of an expansion tool head in a retracted position into an axial end of a PEX pipe, the expansion tool head including a set of jaws circumferentially positioned about a central axis, the set of jaws extending from a base end to a tip end parallel to the central axis, outer surfaces of the jaws having a continuously curved outer profile that protrudes in a convex manner outwardly from the central axis, the outer profile having a rounded shape extending in a direction along the central axis, the continuous, convex, curved profile configured to limit an initial insertion distance of the tip end into an end of the PEX pipe and control local deformation of an inner surface of the end of the PEX pipe;

actuating the set of jaws with an actuator to move the set of jaws outward from the retracted position to an expanded position, wherein, when moving the jaws from the retracted position to the expanded position includes moving each of the jaws at the base end by a first radial distance relative to the central axis, and moving each of the jaws at the tip end by a second radial distance relative to the central axis thereby expanding the axial end of the PEX pipe, wherein the second radial distance that the tip end moves is less than the first radial distance that the base end moves, and wherein a radially outermost ring of the curved outer surface between the base end and the tip end forms a ring of contact at a point within the inner surface of the PEX pipe; and returning the expansion tool head to the retracted position at the initial insertion distance, wherein, in both the retracted position and the expanded position, the outer surfaces of the jaws maintain a rounded cross-section relative to the central axis.

17. The method for expanding an axial end of a PEX pipe of claim 16, wherein the expansion tool head may be inserted into the PEX pipe until a maximum distance, wherein the maximum distance is associated with a size of the expansion tool head.

18. The method for expanding an axial end of a PEX pipe of claim 17, wherein the tip end of the expansion tool head is gradually inserted further into the axial end of the PEX pipe and actuated at each insertion distance up to the maximum distance such that deformation of the axial end of the PEX pipe is gradual and localized.

19. The method for expanding an axial end of a PEX pipe of claim 16, wherein, when the jaws are in the expanded position, the curved outer surface of adjacent jaws are tangent to one another at a first axial position proximate to the base end and, when the jaws are in the retracted position, the curved outer surface of adjacent jaws are tangent to one another at a second axial position proximate to the tip end.

20. The method for expanding an axial end of a PEX pipe of claim 16, wherein the continuously curved convex surface from one axial end to the other is designed to inhibit permanent deformation in the PEX material of the pipe during actuation of the set of jaws.

21. The method for expanding an axial end of a PEX pipe of claim 11, wherein the set of jaws is biased towards the retracted position.

22. The method for expanding an axial end of a PEX pipe of claim 16, wherein each of the jaws includes a set of teeth, and wherein the teeth are configured to distribute strain in a non-linear fashion along axial lengths.

23. The method for expanding an axial end of a PEX pipe of claim 11, wherein the continuously curved profile has a parabolic shape relative to the central axis.

* * * * *